United States Patent [19]
Newcomer et al.

[11] Patent Number: 4,998,585
[45] Date of Patent: Mar. 12, 1991

[54] FLOATING LAYER RECOVERY APPARATUS

[75] Inventors: Kevin Newcomer, Monroe; Steve Richter, Ann Arbor, both of Mich.

[73] Assignee: QED Environmental Systems, Inc., Ann Arbor, Mich.

[21] Appl. No.: 436,546

[22] Filed: Nov. 14, 1989

[51] Int. Cl.$^5$ .................. E21B 43/38; B01D 17/00
[52] U.S. Cl. .................. 166/105; 166/53; 166/369; 210/104; 210/121; 210/242.3; 210/776; 417/61
[58] Field of Search .............. 166/53, 68, 105, 107, 166/369, 370, 372, 265; 210/104, 121, 242.1, 242.3, 776, 122, 923; 417/61, 118

[56] References Cited

U.S. PATENT DOCUMENTS

| | | | |
|---|---|---|---|
| 3,303,932 | 2/1967 | Hirs et al. | 210/776 |
| 3,647,319 | 3/1972 | McLean et al. | 417/143 |
| 3,782,553 | 1/1974 | Brekke | 210/923 |
| 3,901,811 | 8/1975 | Finch | 210/538 |
| 3,991,825 | 11/1976 | Morgan | 166/68 |
| 4,273,650 | 6/1981 | Solomon | 210/923 |
| 4,469,170 | 9/1984 | Farmer, Jr. | 210/104 |
| 4,489,779 | 12/1984 | Dickinson et al. | 168/64 |
| 4,497,370 | 2/1985 | Breslin | 166/372 |
| 4,527,633 | 7/1985 | Mclaughlin et al. | 166/64 |
| 4,546,830 | 10/1985 | McLaughlin et al. | 166/64 |
| 4,610,788 | 9/1986 | Ward | 210/923 |
| 4,625,801 | 12/1986 | McLaughlin et al. | 166/64 |
| 4,663,037 | 5/1987 | Breslin | 210/170 |
| 4,678,040 | 7/1987 | McLaughlin et al. | 166/64 |
| 4,727,936 | 3/1988 | Mioduzzewski et al. | 166/53 |
| 4,761,225 | 8/1988 | Breslin | 210/121 |
| 4,872,994 | 10/1989 | Jakob | 166/265 |

FOREIGN PATENT DOCUMENTS 1367088 6/1964 France .

Primary Examiner—Bruce M. Kisliuk
Attorney, Agent, or Firm—Harness, Dickey & Pierce

[57] ABSTRACT

A floating layer recovery apparatus is disclosed for selectively pumping a liquid floating on groundwater. The apparatus preferably includes a first float which is buoyant in the floating layer attached by a guide to a bottom float which has neutral buoyancy in the groundwater. A middle float is slidably attached to the guide for upward and downward movement between the first and bottom floats. The middle float being an inlet is constructed to have an effective density in the assembly such that it rests at a point where its inlet is near the bottom of the floating layer. Coiled conduits disposed above and below the bottom float carry the floating layer liquid received by the inlet to a pump disposed below. The pump then pumps the floating layer liquid from the conduit to the ground surface. In a preferred embodiment, more precise control over the level of the inlet port is achieved by means of an adjustable inlet port means.

11 Claims, 4 Drawing Sheets

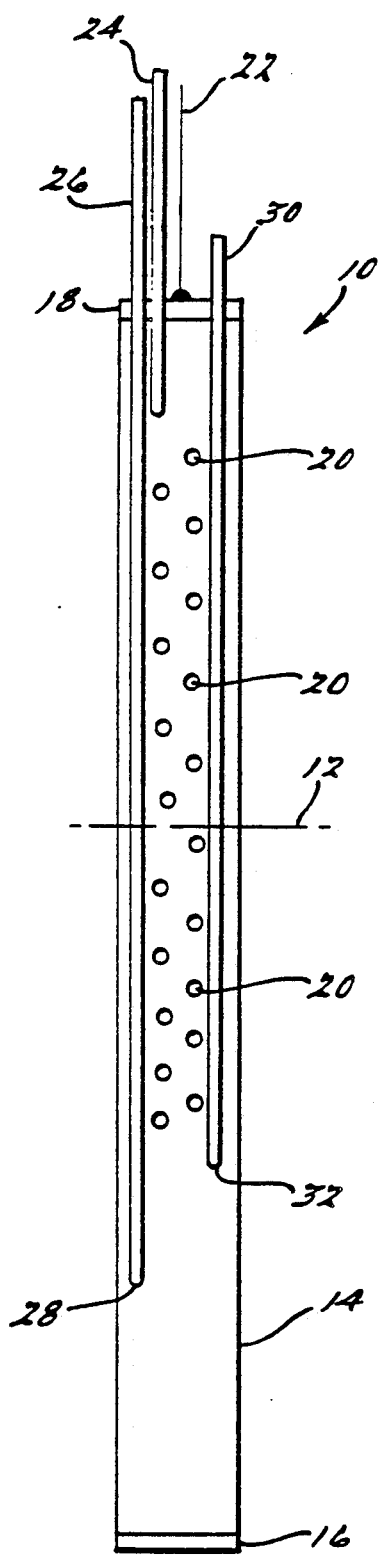
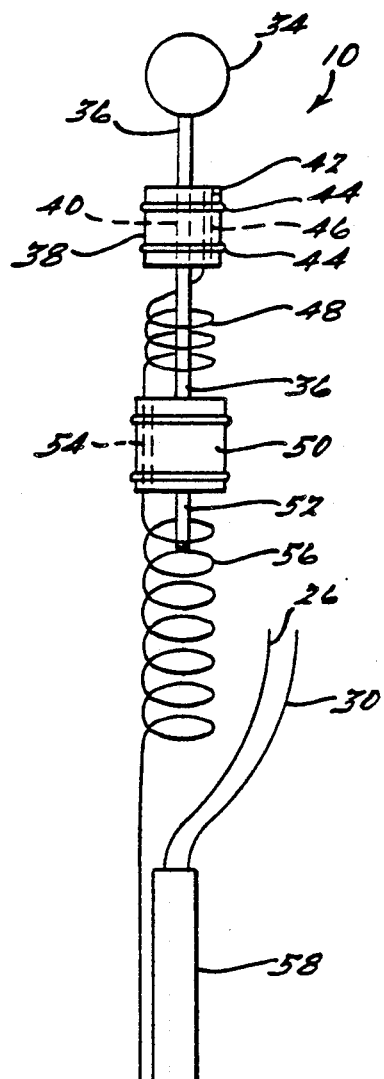
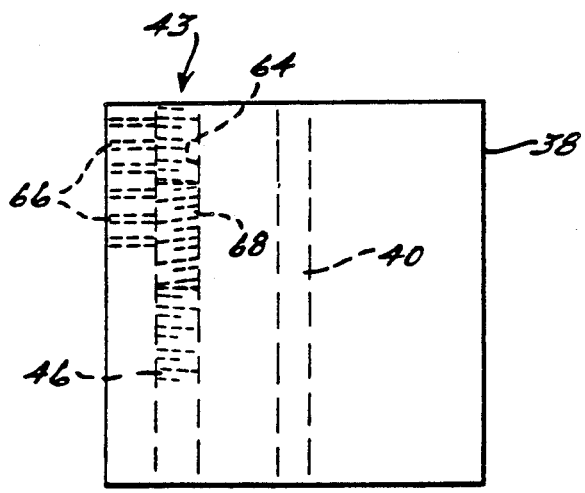

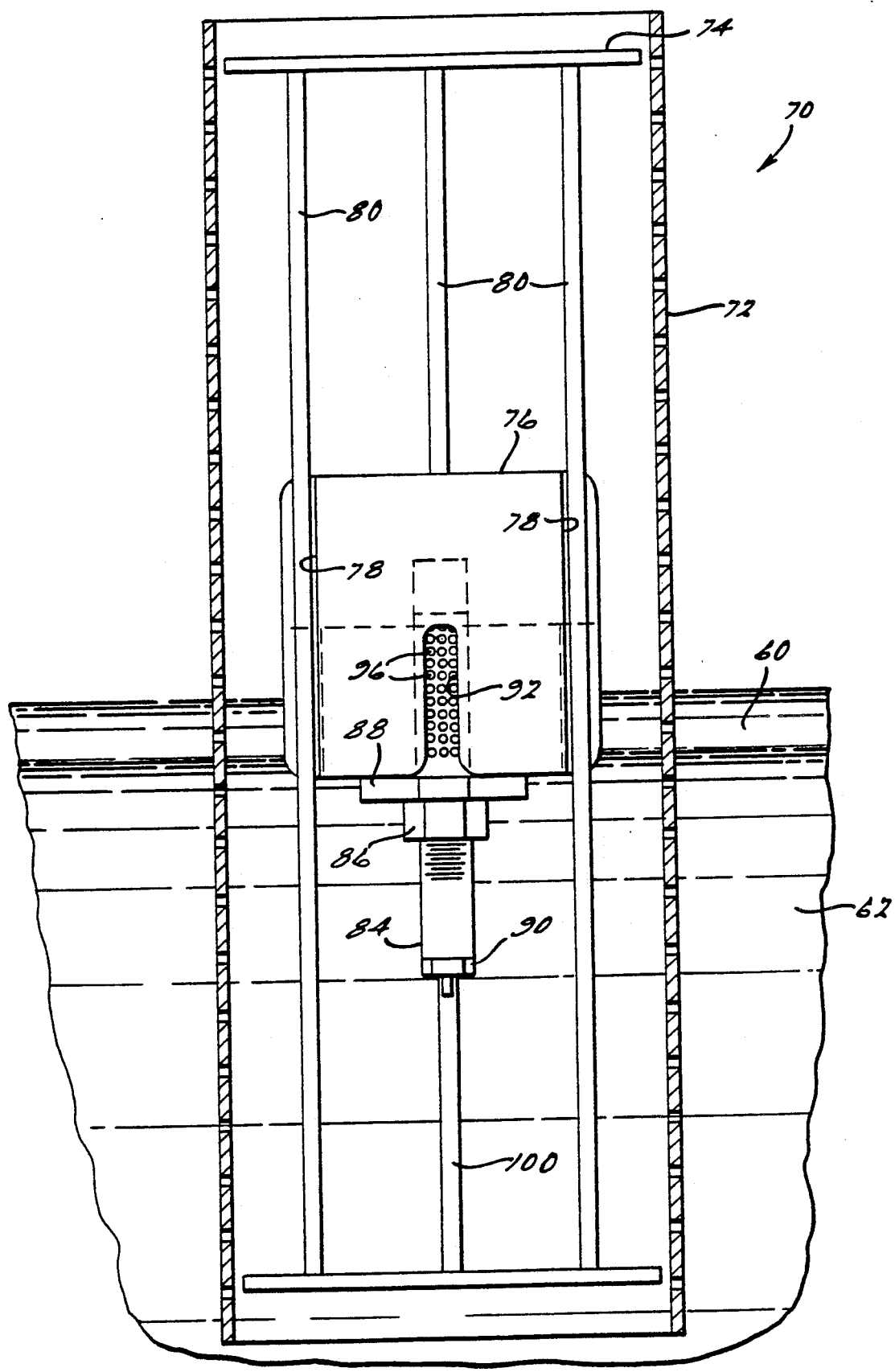

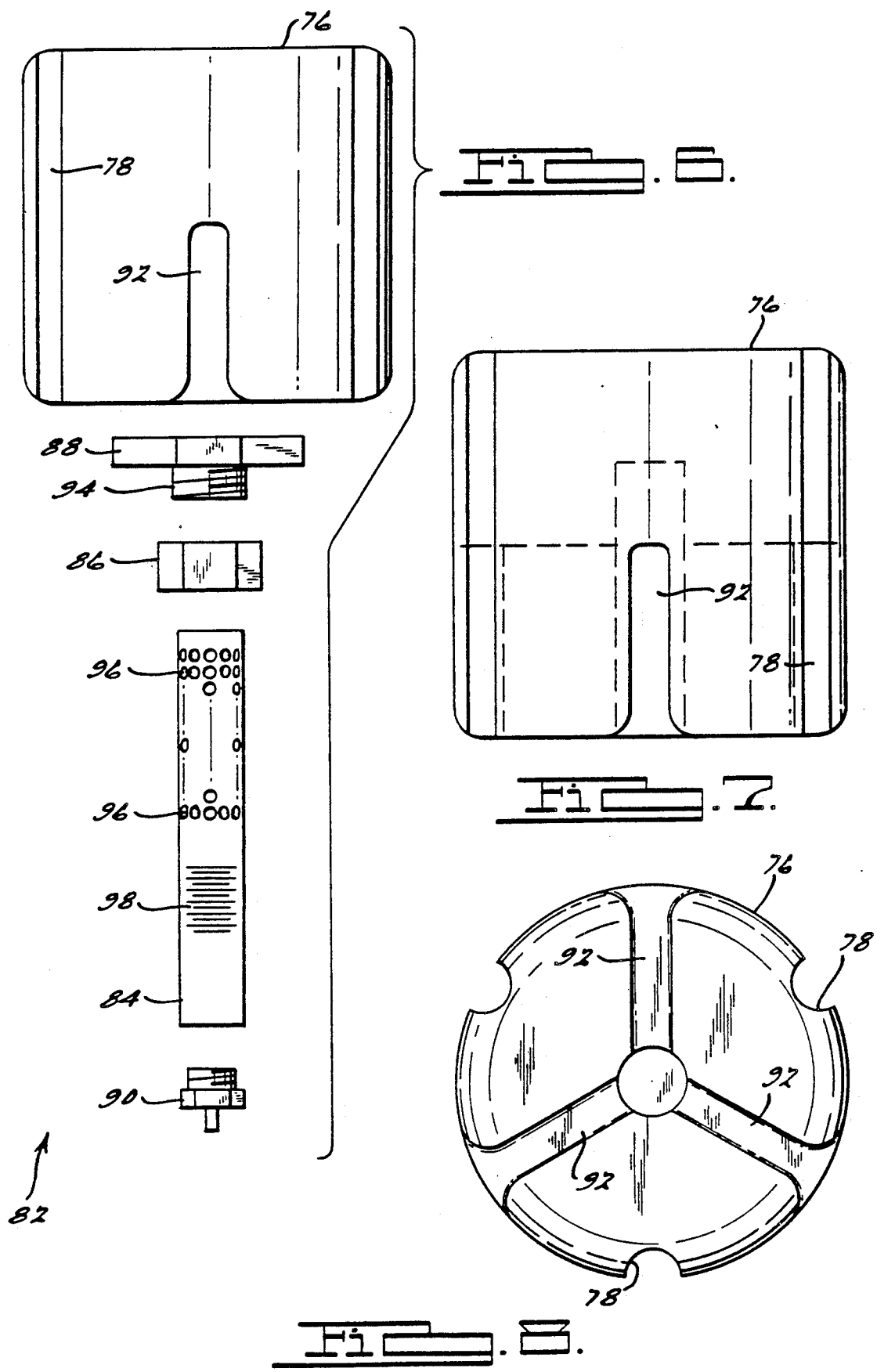

FLOATING LAYER RECOVERY APPARATUS

BACKGROUND OF THE INVENTION

1. Technical Field

This invention relates to a fluid pumping apparatus and, more particularly, to a system for pumping an underground floating liquid layer.

2. Discussion

Recent expanded concern for the environment has resulted in various government-imposed environmental regulations. Among such regulations are requirements relating to the monitoring and improvement of groundwater quality. In response to these requirements, water quality analytic capabilities have been improved and water sampling and pumping equipment has been developed. Once it has been determined that groundwater is contaminated, it is often desirable to decontaminate the groundwater by pumping the contaminant from the well. This is feasible where, for example, the contaminant is a floating, or sinking layer lying above, or below, the groundwater. By selectively pumping the contaminant from the groundwater the site may be thereby decontaminated. An added benefit and incentive to pumping groundwater contaminants such as hydrocarbons, is that the pumped hydrocarbons may be recycled for reuse. Much of the previously-developed floating layer equipment has not been effective, however, in permitting the efficient pumping of the floating layer to the exclusion of the groundwater.

For example, in some systems, in order to create adequate depth of the floating layer within a well, it is require the pumping of groundwater in the vicinity of the well separately to create a "cone of depression". This, thereby, creates a deeper floating layer for pumping. Such systems however present the added expense of the extra pumping apparatus required to remove the groundwater. In addition, relatively large volumes of groundwater must be pumped to create the cone of depression, which creates problems with disposal of the pumped water. Further, this method can contaminate additional soil layers, thereby raising cleanup costs. In other systems, hydrophobic semipermeable membranes are used to pump hydrocarbons to the exclusion of water. However, such membranes are easily clogged and are thus unacceptable in many applications.

An additional problem with prior systems is that such systems frequently pump near the water where they are prone to clogging. This is because of bacterial growth near the floating layer/water interface which tends to clog the system. Also, when prior systems approach the water layer they sometimes begin to pump a combination of water and the floating layer. In such cases, the water must later be separated from the floating layer before recycling is possible. Thus, it would be desirable to provide a system which will pump a floating well above the water interface when the floating layer is thick enough.

In addition, undesirable pumping of water can occur when the buoyancy of the float is effected by the weight of the discharge line carrying the floating layer. In some prior systems, when the discharge line becomes full, the weight of the full discharge line will pull the float down below desired levels, and when the discharge line is empty the float will raise again. Thus, it would be desirable to provide a system which is unaffected by the weight of filled discharge lines.

An additional problem with discharge lines in prior floating layer pumping systems is due to the fact that the float in the floating layer must necessarily move up and down, and the discharge line must contain extra length to permit this motion to be unimpeded. It is known that sometimes this loop of discharge line gets caught or rubs on the sides of the well and thus interferes with the free movement of the float. This may prevent the float from rising to the proper level and may cause the inlet to take in water instead of the floating layer. Thus it would be desirable to have a floating layer pumping apparatus wherein the discharge line does not interfere with free vertical motion of the float.

SUMMARY OF THE INVENTION

Pursuant to the present invention, a method and system is provided for recovery of a layer of a first underground liquid floating on a second underground liquid in a well. The system includes a first float disposed in the well so that it is in the first liquid. The first float has an effective buoyancy such that it floats in the first liquid. A second float is disposed in the well below the first float. The second float is also substantially in the first liquid. The second float has an effective buoyancy such that it floats near the bottom of the first liquid. Because of the effective buoyancy of the floats, the apparatus can pump a floating layer well above the water interface when the floating layer is thick to avoid clogging.

The second float also includes an inlet on its surface for permitting entry of the first liquid. A conduit is connected to the inlet and extends below the second float to a third float disposed in the second liquid. The third float has a density such that it will remain submerged in the second liquid. A guide means is used to rigidly connect the first and third floats while permitting the second float to slide up and down. In addition, a pump is connected to the conduit for pumping the first liquid from the well to a point above the ground.

In the preferred embodiment, the conduit between the second and third float and also between the third float and the pump is coiled to permit free motion of the second float with respect to the first and third floats. In addition, an adjustable inlet may be employed to permit even more precise control of the inlet of the floating layer. Also, a housing encloses the floats to prevent sticking of the floats during vertical motion.

BRIEF DESCRIPTION OF THE DRAWINGS

The various advantages of the present invention will become apparent to one skilled in the art, by reading the following specification and by reference to the drawings in which:

FIG. 1 is a longitudinal side view of a floating layer recovery system according to the present invention;

FIG. 2 is a view of the interior components of the floating recovery apparatus shown in FIG. 1 with the housing removed;

FIG. 4 is a diagrammatic view of the middle float showing an alternative inlet port mechanism in accordance with the second embodiment of the present invention;

FIG. 5 is a diagrammatic view partially in cross-section of a third embodiment of a floating layer recovery apparatus incorporating a single float in accordance with the present invention;

FIG. 6 is an exploded view of the float and inlet components of the third embodiment of the present invention according to FIG. 5;

FIG. 7 is a side view, partially in cross-section of the float in accordance of the third embodiment of the present invention shown in FIG. 5; and FIG. 8 is a bottom view of the float, in accordance with the third embodiment of the present invention shown in FIG. 5.

DETAILED DESCRIPTION OF THE PREFERRED EMBODIMENTS

Figure 3:
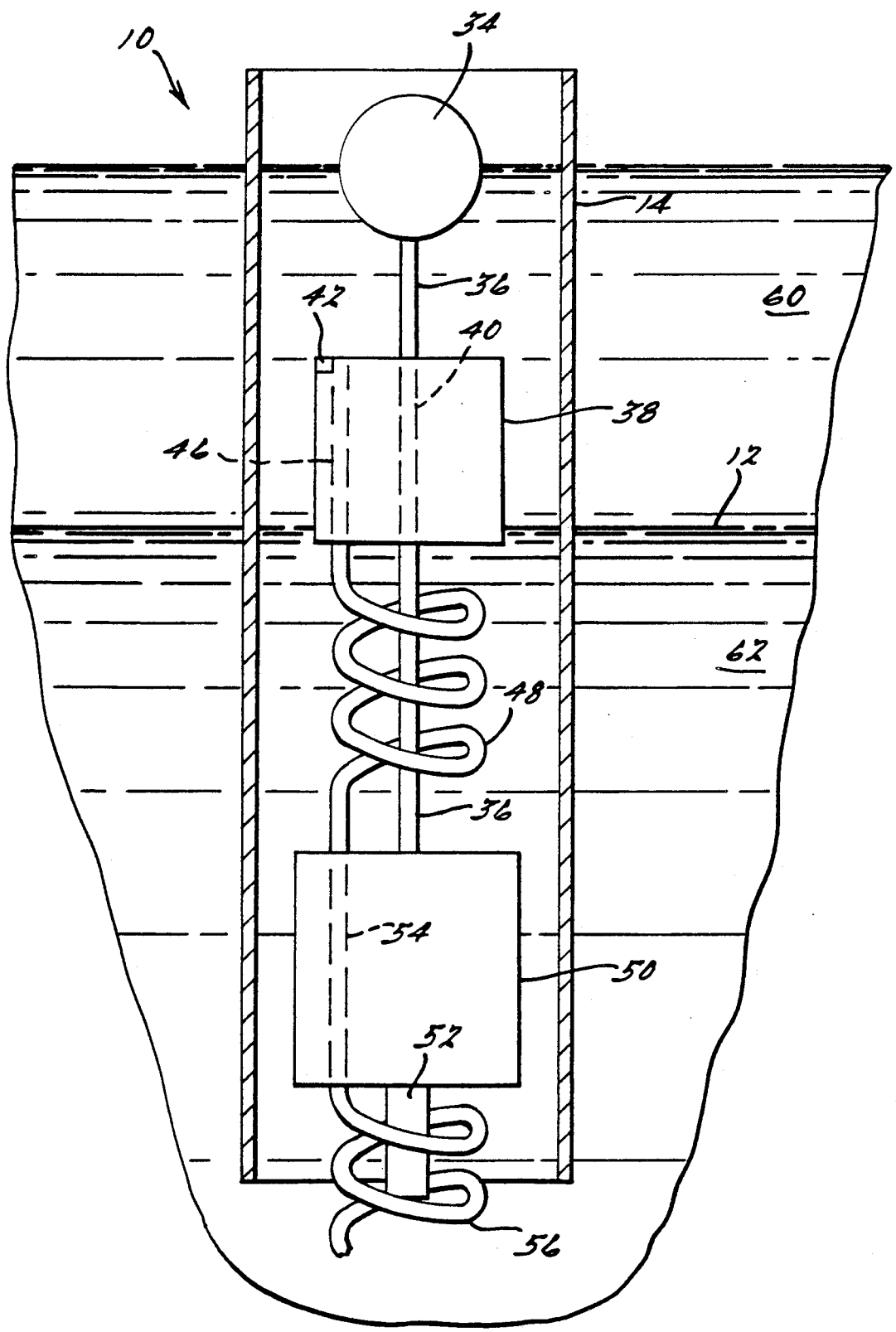
FIG. 3 is an expanded view, partially in cross-section, of the floating layer recovery apparatus shown in FIG. 1.

Referring now to FIG. 1 there is shown a floating layer recovery apparatus 10 which is inserted into a conventional well such that the interface between the groundwater and the floating layer occurs at approximately the position 12. In the preferred embodiment, a four inch diameter well (not shown) is employed, and a three inch metal housing 14, preferably fabricated of stainless steel, is inserted into the well. The stainless steel housing 14 includes a bottom plug 16, which encloses the bottom end of the housing 14. Likewise, a top housing cap 18 encloses the top end of the housing 14. A series of inlet holes 20 are disposed along the middle portion of the housing wall to permit fluids surrounding the housing 14 to enter the housing interior. It will be appreciated that the four inch well casing (not shown) will also have a series of openings so that the groundwater and floating layer will enter the well and the housing and the interface 12 between the groundwater and the floating layer will occur at approximately the same level as in the surrounding ground.

In order to lower the housing 14 to the desired depth the housing is suspended by a cable 22. A conventional bubbler line 24 may be employed with a conventional body pressure sensing apparatus in the conventional manner to ascertain from the ground level when the desired depth has been reached. An air supply tube 26 extends from the ground level and is affixed along the exterior of the housing 14, and enters the housing through an opening 28 near the lower portion of the housing 14. Likewise, a discharge tube 30 extends from an opening 32 in the housing, and is attached to the exterior of the housing and upward to the ground level. As will be described in more detail below, floating layer liquids are pumped upwardly to ground level by means of air supplied through the air tube 26 which forces floating layer liquids through the discharge tube 30 to the ground level.

Referring now to FIG. 2, there is shown the interior components of the floating layer recovery apparatus 10 which are contained within the housing 14. In general, the interior components in the floating layer recovery apparatus 10 include a top float 34 which is preferably a hollow stainless steel sphere. The overall density of the top float 34 is chosen so that it readily floats in the floating layer, which may be, for example, liquid hydrocarbons. Alternatively, it will be appreciated that other shapes and materials may be used for the top float, for example, a cylindrical shape may be employed, and other materials such as closed cell foam fabricated of polypropylene or similar polymeric material may also be used. Attached to the bottom of the top float 34 is a stainless steel rod 36 which is rigidly affixed to the top float 34 and extends vertically downward about 12 inches in length. Below the top float 34 is positioned a secondary float 38 which is preferably made of stainless steel or polypropylene and is generally of cylindrical shape and approximately four to five inches in vertical height. Secondary float 38 has a central axial bore 40 extending vertically through it into which the rod 36 is inserted. Axial bore 40 is slightly greater in diameter than the diameter of rod 36 so that secondary float may easily slide up and down along rod 36 while remaining in a substantially vertical orientation. Secondary float 38 includes an inlet port 42 disposed near the top of the secondary float, as will be explained in more detail below. Secondary float 38 also includes a set of annular slides 44 for maintaining vertical orientation of the secondary float during up and down motion within the housing 14. It will be appreciated that other means of retaining secondary float 38 in a vertical orientation may be employed, such as protruding standoffs for making slidable contact with the interior of the housing 14, during up and down motion of secondary float 38.

The density of secondary float 38 is selected so as to achieve an effective buoyancy in the floating layer that is slightly positive but near neutral. Also, the secondary float 38 floats in water. It will be appreciated that the effective buoyancy is the buoyancy of the float that results when assembled in the floating layer recovery apparatus 10, in accordance with the present invention. Thus, when a floating layer is present, secondary float 38 will tend to sink slightly in the floating layer. More precise control over the position of the inlet is achievable by means of the adjustable inlet, described in more detail below. Floating layer liquids entering inlet 42 pass into a bore 46 inside secondary float 38, and travel to the bottom of secondary float 38, where the liquids enter a helically coiled conduit 48. Coiled conduit 48 is made of TYGON and is coiled around the rod 36, preferably at least three revolutions, i.e.: consists of three or more helical convolutions.

Coiled conduit 48 is then connected to the top of a third, or bottom float 50, which is also rigidly attached to rod 36. Bottom float 50 preferably consists of a stainless steel cylinder approximately three to four inches tall. Alternatively, it could be constructed of other materials such as polypropylene. A keel 52 is attached to the bottom of the bottom float 50 and is preferably made of stainless steel. Keel 52 serves two purposes. As a keel it serves to stabilize the entire assembly of all three floats and help maintain the three floats 34, 38, 50 in a vertical disposition. In addition, keel 52 provides a convenient means for adjusting the effective buoyancy of the bottom float 50 to the desired level. In the preferred embodiment, bottom float 50 is chosen to have an effective buoyancy that is approximately neutral in groundwater so that it, in essence, hovers at a given level in the groundwater. A vertical bore 54 extends through bottom float 50 from the conduit 48 at the top to the bottom of float 50 where it is connected to a second coil discharge conduit 56, similar but longer than the conduit 48. Conduit 56 includes a larger number of coils, such as seven, as shown in FIG. 2. Conduit 56 extends to the bottom portion of a gas displacement pump 58 which may, by way of example, consist of a pump identified by the registered trademark "Well Wizard" manufactured by QED Environmental Systems, Inc., of Ann Arbor, MI, and described in more detail in U.S. Pat. No. 4,489,779. It will be appreciated that other kinds of pumps may also be employed. Air supply conduit 26 extends outwardly from the top of gas displacement pump 58 out of the opening 28 as shown in FIG.

1. Likewise, the discharge conduit 30 extends from pump 58, out of opening 32 in the housing 14 as shown in FIG. 1.

In operation, the floating layer recovery apparatus 10, in accordance with the present invention, is inserted into a well (not shown), so that the interface 12 between the floating layer and the groundwater occurs at approximately the midway point as shown in FIG. 1. It should be noted that it is an advantage of the present invention that the location of the interface 12 need not be known as long as the floating layer is within the range of motion of the second float 38. The top float 34 will then float in the floating layer near the top surface of the floating layer. As shown in FIG. 3 it can be seen that in a deep floating layer the top float 34 will tend to pull all three floats 34, 38 and 50 upward into the floating layer. This has the advantage of avoiding the murky water/floating layer interface. The floating layer liquid will then enter inlet 42, travel through bore 46, conduit 48, bore 54, conduit 56, and into pump 58 where it is pumped to the ground level through discharge tube 30. As the floating layer is pumped and lowers or, alternatively in a thinner floating layer, as shown in FIG. 3, the second float 38 will still be substantially disposed in the floating layer, while the bottom float 50 will be substantially in the ground water. It is important to note that secondary float 38 is free to slide up and down along rod 36 and is somewhat independent of the movement of the top float 34 and bottom float 50. That is, within a given range, as top float 34 and bottom float 50 move up or down together, secondary float 38 is free to seek its natural level without interference from the top float 34, or bottom float 50, due to the coiled conduit 48. As the floating layer 60, shown in FIG. 3, is pumped it becomes thinner and top float 34 will lower causing bottom float 50 to also lower. Since secondary float 38 floats in the groundwater 62, it will also lower but will not permit the inlet 42 to sink below the interface line 12 between the groundwater and floating layer.

Utilizing the above technique, in accordance with the present invention, a floating layer may be pumped down to a thickness of approximately ½ inch without pumping groundwater. This is particularly useful in applications where it is desired to pump a floating layer, to the exclusion of groundwater, down to a relatively thin depth. At this point, it may be desired to pump the remainder of the ½ inch thickness of floating layer. To accomplish this, the inlet 42 may be adjusted to accept floating layer liquids at a lower level by means of the adjustable inlet 43 shown in FIG. 4.

In accordance with a second embodiment of the present invention as shown in FIG. 4, the secondary float 38 includes a threaded portion 64 in the inner diameter of the bore 46. Also, a series of horizontal holes 66 are drilled from the side of the secondary float 38 into the vertical bore 46. A hollow tubular threaded sleeve 68 is threaded into the bore 46 from the top. Depending on the depth that threaded sleeve 68 is inserted, it will block some or all of the inlet ports 66. For example, as shown in FIG. 4, threaded sleeve 68 is inserted so that it blocks the bottom three inlet ports, but leaves the top three inlet ports open. As a result, fluid may flow from a level as low as the third inlet port, which is the lowest inlet port 66 that is not blocked by sleeve 68. It will be appreciated that the highest level of the adjustable inlet port 43 occurs when the threaded sleeve 68 is level with the top of the secondary float 38 such that floating layer must pass over the top of the secondary float 38 to enter bore 46. The lowest level possible is achieved when the threaded sleeve 68 is inserted into bore 46 so that all six openings 66 are open. While the adjustable inlet port 43 shown in FIG. 4 is the preferred embodiment, it will be appreciated that many other means of achieving adjustability of the inlet port may be employed. Also, it will be appreciated that by adjusting the inlet port position in accordance with the present invention, lower inlet levels, even reaching into the water layer, are possible when desired.

It will also be appreciated that top float 34 is primarily functional when the floating layer 60 is relatively deep. With thinner floating layers, top float 34 will not be in the floating layer and will not significantly affect the function of the floating layer recovery apparatus 10. Accordingly, in some cases it may be possible to achieve the advantages of the present invention by using the floating layer recovery apparatus 10 with the top float 34 removed. For example, the effective buoyancy of the second float 38 may be increased.

It can be seen from the above discussion that the floating layer recovery apparatus, in accordance with the present invention, permits the recovery of floating layer liquids to the exclusion of groundwater. The use of helically coiled conduits 48 and 56 supported by the bottom float 50 minimizes the forces on secondary float 38 as the level of groundwater and depth of the hydrocarbon layer changes. In addition, the weight of discharge conduits 48 and 56, when full, will not effect the level of the inlet 42. As a result, the precise level of inlet 42 can be readily controlled. In particular, it has been found that the floating layer recovery apparatus 10 can satisfactorily pump floating layer liquids while permitting movement within the housing 14 in the range of several feet of vertical motion. Further, the placement of air supply tube 26 and discharge tube 30 on the exterior of the housing 14 eliminates the possibility of interference of the upward extending conduits with the free vertical motion of the floats. Also, the placement of all the moving floats and conduits within the housing insures against sticking against the walls of the well.

Referring now to FIG. 5, a third embodiment of the present invention is shown which incorporates a single float. The floating layer recovery apparatus 70 shown in FIG. 5 includes a well casing 72 into which a float cage 74 containing a float 76 is inserted. Float 76 is preferably a cylindrical blow molded polypropylene float, as shown in more detail in FIGS. 7 and 8. Float 76 includes a series of three vertical grooves 78 which permit the float 76 to slide vertically while restrained by cage 74. Cage 74 includes vertical guides 80 which are partially engaged with the grooves 78. Floating layer recovery apparatus 70 also includes an adjustable inlet assembly 82 which includes a screen 84, nut 86, top fitting 88 and bottom fitting 90. Float 76 also includes a series of grooved channels 92, as best seen in FIG. 8 to permit fluid to reach the screen 84. When screen 84 is inserted into the bottom portion of float 76, as shown in FIG. 5, it is retained in place by fitting 88 containing slotted thread 94, which receives compression nut 86 to hold the screen 84 in a fixed vertical position. As shown in FIG. 6, the screen 84 includes a series of openings 96, the lowest of which will determine the lowest inlet level of floating layer 60.

Therefore, to adjust the inlet level of screen 84, compression nut 86 is loosened and the screen 84 is raised or lowered so that the lowest of inlet openings 96 are at the desired height. A series of calibration markings 98 are provided to provide a visible means of reading the particular inlet adjustment level. At the bottom of lower fitting 90 is attached a discharge conduit 100 which then passes downward below cage 74 to a pump (not shown) which may be a conventional QED Pulse Pump as shown in FIG. 2. In operation, the third embodiment of the present invention shown in FIG. 5, is a simplified float for the recovery of floating layers, which permits precise control of the inlet level to pump a floating layer to the exclusion of water.

It should also be recognized that the float 76 in accordance with the third embodiment may be employed either as shown in FIGS. 5-8, or may be employed in conjunction with other floats, and in conjunction with coiled conduits, such as 48 and 56, and in conjunction with a housing 14 such as described above in connection with the first and second embodiments of the present invention, shown in FIGS. 1-4. Also, other means of permitting free motion of the secondary float 38 besides the coiled conduits 48 and 56, may be employed. For example, an expandable bellows type conduit may be used. While the above description constitutes the preferred embodiments of the present invention, it will be appreciated that the invention is susceptible to modifications, variation, and change without departing from the proper scope and fair meaning of the accompanying claims.

What is claimed is:

1. Apparatus for recovery of a layer of a first underground liquid floating on a second underground liquid in a well, said apparatus comprising:
   first float means disposed in said well in said first liquid, said float means having an effective buoyancy such that it floats in said first liquid;
   second float means disposed in said well in said first liquid, said float means having an effective buoyancy such that it floats near the bottom of said first liquid, said second float means having top, side and bottom surfaces;
   an inlet means disposed on said second float surface for permitting entry of said first liquid;
   conduit means coupled to said inlet means and extending below said second float means;
   third float means disposed in said second liquid and having an effective buoyancy such that said third float means will remain submerged in said second liquid, said conduit means being coupled to said third float; said
   guide means for slidably connecting said second float between said first and third float means.

2. The apparatus of claim 1, further comprising a pump means connected to said conduit means for pumping said first liquid.

3. The apparatus of claim 2 further comprising enclosure means for containing said first, second and third float means and said pump means, said enclosure means including openings for permitting liquids in said well to enter said enclosure, and said enclosure including discharge conduit means coupled to said pump for directing said first liquid upward passed said first, second and third float means externally of said enclosure means.

4. The apparatus of claim 3 wherein said second and third float means includes a slide means attached to the outer surface of said float for slidably contacting the inner wall of said enclosure means, whereby said second and third float means may freely slide within said enclosure.

5. Apparatus of claim 1 wherein the portion of said conduit means extending between said second float means and said third float means, and the portion of said conduit means between said third float means and pump means is coiled so as to permit substantial vertical motion of said second float without substantial resistance to said vertical motion.

6. The apparatus of claim 1 wherein said second and third float means have a vertically disposed central opening and said guide means comprises a rod affixed to said first and third float means and slidably passing through said opening in said second float means.

7. The apparatus of claim 6 further comprising a keel means attached to the lower portion of said guide means for giving said third float means a predetermined effective buoyancy and for maintaining said guide means in an approximately vertical posture.

8. An apparatus for recovery of a layer of a first underground liquid floating on a second underground liquid in a well, said apparatus comprising:
   a pump;
   float means disposed in said well in said first liquid,
   central cavity extending partially upward from the bottom of said float;
   a radial channel extending from said central cavity to the side of said float;
   screen disposed in said central cavity having a plurality of openings for receiving said first liquid entering said radial channel;
   conduit coupled to said screen for directing said first liquid from said screen to said pump; and
   means for adjusting the height of said screen to change the level of the lowest of said openings in said screen with respect to said float.

9. The apparatus according to claim 8, further comprising a cage disposed in a fixed position in said well for slidably restraining said float during vertical movement thereof.

10. Apparatus for recovery of a layer of a first underground liquid floating on a second underground liquid in a well, said apparatus comprising:
    first float means disposed in said well in said first liquid, said float means having an effective buoyancy such that is it floats in said first liquid;
    second float means disposed in said well in said first liquid, said second float means having an effective buoyancy such that is floats near the bottom of said first liquid;
    an inlet means moveable concurrently with said second float for permitting entry of said first liquid;
    conduit means coupled to said inlet means and extending below said second float means;
    third float means disposed in said second liquid and having an effective buoyancy such that said third float means will remain submerged in said second liquid, said conduit means being coupled to said third float; and
    guide means for slidably connecting said second float between said first and third float means.

11. Apparatus for recovery of a layer of a first underground liquid floating on a second underground liquid in a well, said apparatus comprising:
    said float means disposed in said well in said first liquid, said float means having an effective buoyancy such that it floats in said first liquid;
    second float means disposed in said well in said first liquid, said second float means having an effective buoyancy such that it floats near the bottom of said first liquid;
an inlet means disposed in a predetermined position with respect to said second float for permitting entry of said first liquid;
conduit means coupled to said inlet means and extending below said second float means;
third float means disposed in said second liquid and having effective buoyancy such that said third float means will remain submerged in said second liquid, said conduit means coupled to said third float; and
guide means for slidably connecting said second float between said first, and third float means.

* * * * *

UNITED STATES PATENT AND TRADEMARK OFFICE
CERTIFICATE OF CORRECTION

PATENT NO. : 4,998,585

DATED : Mar. 12, 1991

INVENTOR(S) : Kevin Newcomer et al.

It is certified that error appears in the above-identified patent and that said Letters Patent is hereby corrected as shown below:

Col. 1, Line 34, "is require" should be --requires--;

Col. 6, Line 28, "effect" should be --affect--;

Col. 7, Line 49, "said" should be --and--;

Col. 8, Line 1, before "Apparatus" insert --The--;

Col. 8, Line 22, "liquid," should be --liquid;--;

Col. 8, Line 45, after "that" delete --is--;

Col. 8, Line 48, "is" should be --it--;

Col. 8, Line 64, "said" first occurrence, should be --first--.

Signed and Sealed this

Twenty-fifth Day of May, 1993

Attest:

MICHAEL K. KIRK

*Attesting Officer*     *Acting Commissioner of Patents and Trademarks*